Sept. 3, 1935.  O. C. SNELL ET AL  2,013,293

UNION

Filed Jan. 31, 1935

Inventors
Owens C. Snell
Charles E. Girten

By Hardway Cather
Attorneys

Patented Sept. 3, 1935

2,013,293

UNITED STATES PATENT OFFICE 2,013,293

UNION

Owens C. Snell and Charles E. Girten, Houston, Tex.

Application January 31, 1935, Serial No. 4,251

6 Claims. (Cl. 285—128)

This invention relates to a union.

An object of the invention is to provide a union for connecting sections of pipe and the like whereby a leak-proof joint may be formed between the sections, and a quick connection or disconnection may be made.

Another object of the invention is to provide a union of the character described whereby the connected parts may be drawn very closely together, with little effort on the part of the workmen, and a very tight joint thus formed between the connected parts.

Another object of the invention is to provide in a device of the character described, a novel type of clamp ring for drawing the connected parts together, said ring being provided with impact faces whereby an implement such as a hammer may be used for tightening up or releasing the clamp ring.

Figure 1:
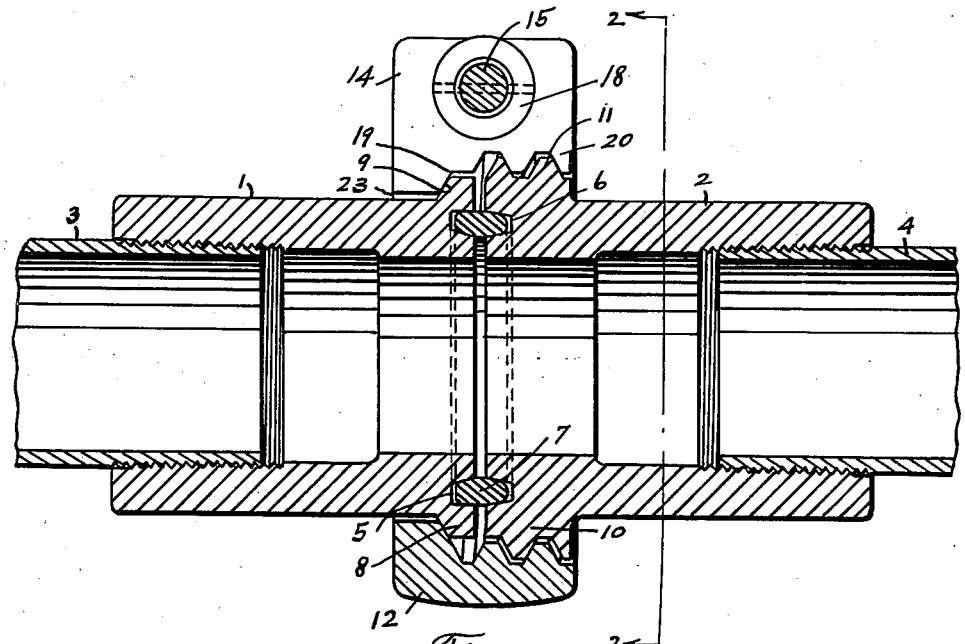
Figure 2:
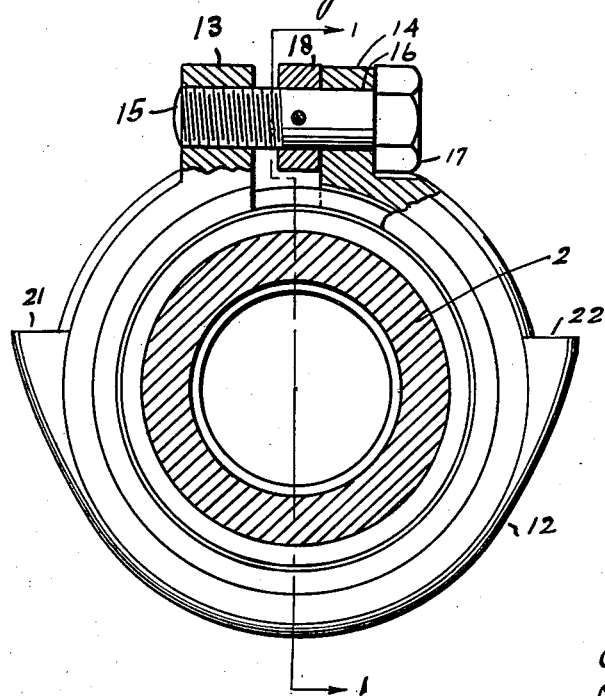

With the above and other objects in view, the invention has particular relation to certain novel features of construction, operation, and arrangement of parts, an example of which is given in this specification and illustrated in the accompanying drawing, wherein, Figure 1 shows a longitudinal sectional view of the union taken on the line 1—1 of Fig. 2, and Figure 2 shows a cross-sectional view taken on the line 2—2 of Figure 1.

Referring now more particularly to the drawing wherein like numerals of reference designate similar parts in each of the figures, the numerals 1 and 2 refer respectively to two coupling members to which the pipe sections 3 and 4, or other parts to be united, are connected.

The facing ends of said coupling members have coinciding grooves 5 and 6 in which the seal ring 7 is seated to form leak-proof joints.

As will be noted, the outer wall of the groove 5 is approximately parallel with the axis of the sections 1, 2, and the inner wall converges inwardly, and the end of the seal ring 7 fitted into the groove 5 is correspondingly shaped so that when the seal ring is driven into the groove 5 it will seat very tightly therein and will not be liable to become detached, and the walls of the groove 6 diverge and the end of the seal ring seated in the groove 6 is tapered to conform to the flare of said groove 6 to the end that when the coupling members 1, 2, are separated, the said seal ring will remain attached to the coupling member 1.

The adjacent ends of the coupling members are provided, one with an external flange 8 whose outer side has a tapered annular face 9, and the other with an external flange 10 having external coarse threads 11 whose overall diameter is greater than that of the flange 8.

There is a clamp ring 12 which is open at one side, and at said open side, the ends of the ring have the outwardly turned lugs 13, 14.

There is a clamp bolt 15 which is fitted through a bearing 16 in the lug 14 and which has a head 17 which abuts the outer side of the lug 14. Fastened on the clamp bolt and abutting the inner side of the lug 14, there is a collar 18 whereby the bolt 15 has a swiveling connection with the lug 14. The bolt 15 has a threaded connection with the lug 13.

The clamp ring 12 has an inside annular tapering face 19 conforming in shape to and fitting against the face 9, and also has the inside coarse threads 20 which mesh with the threads 11.

In making up the union, the parts 1 and 2 are assembled as shown, and the clamp ring 12 may be slipped over the coupling member 1, the threads 20 being of sufficient inside diameter to pass over the flange 8, and the clamp ring may then be turned by hand to cause the threads 20 to intermesh with the threads 11, the faces 9 and 19 being drawn into abutting relation. It will be noted that only the face of the threads 11 facing away from the inner end of the coupling 2 contact with the opposing faces of the threads, 20, only thus leaving clearance between the crests of the threads and the bottom of the troughs between the threads. The clamp ring may be tightened up by hand sufficiently to form a joint that will be tight enough to prevent leakage of liquid under ordinary pressures, but in case the liquid being conducted is under high pressure, the bolt 15 may be tightened up causing the clamp ring to contract, and the contacting faces of the threads and the contacting faces, 9, 19, will thereupon co-act with wedge-like effect to draw the coupling members 1, 2, closer together to form a very tight leak-proof joint.

The clamp ring is formed with impact faces 21, 22, to receive hammer blows for tightening up or to release it.

It will be noted that a clearance indicated by the numeral 23 has been left between the clamp ring and the coupling member 1, so that in case the coupling members 1 and 2, when connected into pipe line, are not in exact alignment, they may be drawn into alignment without the coupling member 1 binding against the clamp ring.

The drawings and description disclose what is now considered to be a preferred form of the invention by way of illustration only, while the broad principle of the invention will be defined by the appended claims.

What we claim is:—

1. A union comprising aligned tubular coupling members whose facing ends have coinciding grooves, a seal ring in said grooves, one of said coupling members having an external tapering face and the other member having coarse external threads of a greater diameter than that of said tapering face, a clamp ring open at one side and having an internal tapering face in contact with said external face and having inside threads of a greater internal diameter than that of said external face, and in mesh with said external threads, said threads being in contact at one side only, and there being a clearance between the crest of the threads and the bottom of the corresponding troughs between the threads, means for contracting said clamp ring whereby the intermeshing threads and contacting faces may be caused to co-act with wedge-like effect to draw the coupling members together.

2. A union comprising aligned tubular coupling members, one having an external tapering annular face and the other having external threads of a greater diameter than that of said face, a clamp ring open at one side and having an internal tapering face adapted to ride against said external face, said ring also having internal threads in mesh with the external threads, the threads of said clamp ring having one side only in contact with the opposing side of the threads of the coupling member and the other side of said threads being spaced apart and the apexes of the threads being spaced from the bottom of the corresponding troughs between the threads, lugs on the open end of the ring, a clamp bolt having a swiveling connection with one lug and a threaded connection with the other lug whereby said clamp ring may be contracted or expanded.

3. A union comprising aligned tubular coupling members, one having an external tapering annular face, and the other having external threads of a greater diameter than that of said face, a clamp ring open at one side and having an internal tapering face adapted to ride against said external face, said ring also having internal threads in mesh with the external threads, the threads of said clamp ring having one side only in contact with the opposing side of the threads of the coupling members and the other sides of said threads being spaced apart and the apexes of the threads being spaced from the bottom of the corresponding troughs between the threads, lugs on the open end of the ring, a clamp bolt having a swiveling connection with one lug and a threaded connection with the other lug whereby said clamp ring may be contracted or expanded, and oppositely located impact faces on said clamp ring.

4. A union comprising aligned coupling members having external faces which converge outwardly, a split clamp ring around said members and covering the joint between them, said clamp ring having inside faces which diverge inwardly in contact with said external faces, the faces of one coupling member and the faces of the ring which contact therewith having a greater diameter than the corresponding diameter of the other face, a lug on each end of the clamp ring at the open side thereof, a clamp bolt having a swiveling connection with one lug and a threaded connection with the other lug whereby the clamp ring may be contracted to draw said coupling members together, or expand them.

5. A union comprising aligned coupling members having external faces which converge outwardly, a split clamp ring around said members and covering the joint between them, said clamp ring having inside faces which diverge inwardly in contact with said external faces, the faces of one coupling member and the faces of the ring which contact therewith having greater diameter than the corresponding diameter of the other face, a lug on each end of the clamp ring at the open side thereof, a clamp bolt having a swiveling connection with one lug and a threaded connection with the other lug whereby the clamp ring may be contracted to draw said coupling members together, or to expand them, one of said members having an outside diameter less than the inside diameter of the surrounding portion of the clamp ring to provide clearance between them.

6. A union comprising aligned coupling members having external faces which converge outwardly, a split clamp ring around said members and covering the joint between them, an annular seal ring between the facing ends of said coupling members provided to seal said joint, said clamp ring having inside faces which diverge inwardly in contact with said external faces, the faces of one coupling member and the faces of the ring which contact therewith having a greater diameter than the corresponding diameter of the other face, a lug on each end of the clamp ring at the open side thereof, a clamp bolt having a swiveling connection with one lug, and a threaded connection with the other lug whereby the clamp ring may be contracted to draw said coupling members together to exert a uniform pressure all the way around on said seal ring.

OWENS C. SNELL.
CHARLES E. GIRTEN.